(12) United States Patent
Quennehen

(10) Patent No.: US 11,193,382 B2
(45) Date of Patent: Dec. 7, 2021

(54) TURBINE ENGINE TURBINE INCLUDING A NOZZLE STAGE MADE OF CERAMIC MATRIX COMPOSITE MATERIAL

(71) Applicant: SAFRAN AIRCRAFT ENGINES, Paris (FR)

(72) Inventor: Lucien Henri Jacques Quennehen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 613 days.

(21) Appl. No.: 15/751,925

(22) PCT Filed: Sep. 5, 2016

(86) PCT No.: PCT/FR2016/052193
§ 371 (c)(1),
(2) Date: Feb. 12, 2018

(87) PCT Pub. No.: WO2017/042461
PCT Pub. Date: Mar. 16, 2017

(65) Prior Publication Data
US 2018/0230837 A1    Aug. 16, 2018

(30) Foreign Application Priority Data
Sep. 9, 2015 (FR) .................................... 15 58366

(51) Int. Cl.
*F01D 9/04* (2006.01)
*F01D 25/24* (2006.01)
*F01D 25/00* (2006.01)

(52) U.S. Cl.
CPC .......... *F01D 9/047* (2013.01); *F01D 25/005* (2013.01); *F01D 25/246* (2013.01);
(Continued)

(58) Field of Classification Search
CPC ...... F01D 25/005; F01D 25/246; F01D 9/041; F01D 9/042; F01D 9/047; F01D 9/142;
(Continued)

(56) References Cited

U.S. PATENT DOCUMENTS 6,537,022 B1 * 3/2003 Housley .................... F01D 9/04
                                                      415/189
7,507,072 B2 * 3/2009 Bart ......................... F01D 5/063
                                                      416/198 A
(Continued)

FOREIGN PATENT DOCUMENTS

FR    2 979 662 A1    3/2013

OTHER PUBLICATIONS

International Search Report dated Nov. 28, 2016, in PCT/FR2016/052193 filed Sep. 5, 2016.

*Primary Examiner* — Kenneth Bomberg
*Assistant Examiner* — Julian B Getachew
(74) *Attorney, Agent, or Firm* — Oblon, McClelland, Maier & Neustadt, L.L.P.

(57) ABSTRACT

A turbine engine turbine including a nozzle stage made of ceramic matrix composite material and including a plurality of annular sectors forming an annulus presenting an inner shroud and an outer shroud, each sector having an inner platform forming a portion of the inner shroud, an outer platform forming a portion of the outer shroud, and at least one airfoil extending between the outer and inner platforms and secured thereto. A metal ring includes at least one annular sector, and presents an outer surface in contact with the surface of the inner shroud opposite from the surface from which the airfoils extend, the metal ring presenting an outside diameter at its outer surface that is greater than the diameter of the inner shroud such that the nozzle stage is held in compression between a casing and the metal ring.

11 Claims, 3 Drawing Sheets

(52) U.S. Cl.
CPC .. *F05D 2220/323* (2013.01); *F05D 2240/128* (2013.01); *F05D 2300/6033* (2013.01); *Y02T 50/60* (2013.01)

(58) Field of Classification Search
CPC ......... F05D 2220/323; F05D 2240/128; F05D 2250/75; F05D 2260/37; F05D 2300/6033
See application file for complete search history.

(56) References Cited

U.S. PATENT DOCUMENTS

| | | | |
|---|---|---|---|
| 2008/0279679 A1 | 11/2008 | Morrison | |
| 2012/0282087 A1* | 11/2012 | Lord | F01D 25/246 415/208.1 |
| 2013/0220435 A1* | 8/2013 | James | B64D 29/08 137/15.1 |
| 2014/0004293 A1 | 1/2014 | Grooms, II et al. | |
| 2014/0227088 A1 | 8/2014 | Beaujard et al. | |

* cited by examiner

TURBINE ENGINE TURBINE INCLUDING A NOZZLE STAGE MADE OF CERAMIC MATRIX COMPOSITE MATERIAL

BACKGROUND OF THE INVENTION

The invention relates to turbine engines, in particular to aviation turbine engines and to industrial turbines, and more particularly, it relates to a turbine nozzle stage made of ceramic matrix composite material or of composite material in which the matrix is at least partially ceramic, and referred to below as CMC material.

Improving the performance of turbine engines and reducing their polluting emissions leads to considering ever-higher operating temperatures.

For elements in the hot portions of turbine engines, proposals have therefore been made to use ceramic matrix composite materials. CMC materials are typically constituted by fiber reinforcement made of refractory fibers, such as carbon fibers or ceramic fibers, densified by a matrix that is ceramic or at least partially ceramic.

Such materials possess remarkable thermostructural properties, mechanical properties that make them suitable for constituting structural elements with the ability of conserving those properties at high temperatures. Furthermore, CMC materials present density that is much lower than the density of the metal materials conventionally used for elements in the hot portions of turbine engines.

Thus, Documents WO 2010/061140, WO 2010/116066, and WO 2011/080443 describe making blades for turbine engine rotor wheels out of CMC and including integral inner and outer platforms. The use of CMC materials for turbine nozzles has also been proposed, in particular in Documents WO 2010/146288, FR 2 979 662, and EP 2 443 318.

A conventional metal turbine nozzle stage is in the form of an annulus made up of a plurality of assembled-together sectors, each sector comprising an inner platform, an outer platform, and a plurality of airfoils extending between the inner and outer platforms and secured thereto. The juxtaposed inner platforms form an inner shroud and the juxtaposed outer platforms form an outer shroud. The inner and outer shrouds together define the gas flow passage through the nozzle stage.

Introducing a CMC nozzle stage, e.g. a high pressure nozzle stage, makes it possible to increase the maximum temperature that can be tolerated compared with a metal nozzle stage, and thus to reduce the quantity of cooling air that is used. This thus serves to increase the performance of the turbine engine.

Nevertheless, because its properties are very different from those of metal, CMC is more sensitive to certain mechanical stresses. Specifically, CMC presents greater stiffness and smaller expansion, and also lower acceptable traction stresses.

Furthermore, integrating a CMC part in a metal environment is difficult because of the thermal expansion differences between CMC and metal. This is made that much more difficult in a turbine engine, and in particular in a high-pressure portion of the turbine engine, since the environment is very hot, thereby exacerbating the differences in coefficients of thermal expansion between the materials, and the aerodynamic forces to which a high pressure nozzle stage is subjected are also very high in this zone of the turbine.

OBJECT AND SUMMARY OF THE INVENTION

The invention seeks to mitigate the above drawbacks and to overcome the above-mentioned difficulties by proposing a turbine engine turbine comprising a turbine nozzle stage made of CMC that is simpler to mount and that is adapted to provide an assembly that is rigid with improved sealing.

The invention provides a turbine engine turbine comprising a casing, a turbine nozzle stage, and a metal ring for supporting abradable material, the turbine nozzle stage being made of ceramic matrix composite material and comprising a plurality of annular sectors forming an annulus presenting an inner shroud and an outer shroud, each annular sector having an inner platform forming a portion of the inner shroud, an outer platform forming a portion of the outer shroud, and at least one airfoil extending between the outer platform and the inner platform and secured thereto, and the metal ring comprising at least one sector that is at least partially annular.

According to a general characteristic of the invention, the metal ring presents an outer surface in contact with the surface of the inner shroud of the nozzle stage opposite from the surface from which the airfoils extend, the metal ring presenting an outside diameter at its outer surface that is greater than the diameter of the inner shroud of the turbine nozzle stage such that the nozzle stage is held in compression between the casing and the metal ring.

The extra size of the diameter, or of the radius, of the outer surface, i.e. the outer peripheral surface of the metal ring, compared with the diameter, or the radius, of the inner peripheral surface of the inner shroud of the nozzle stage makes it possible to clamp the annulus formed by the nozzle stage between the casing and the metal ring, and thereby hold the nozzle stage in position by being compressed between the casing and the metal ring.

This makes it possible to take advantage of the specific properties of CMC, in particular the good compression strength of CMC elements, by making the majority of the CMC nozzle work in compression.

Also, this configuration minimizing the number of parts used and the number of contacts between the various parts, serves to improve sealing and to lighten the assembly formed by the nozzle stage and the metal ring inside the casing.

Sealing is even better improved when the metal ring presents an inside diameter, i.e. the diameter of the inner peripheral surface, that is small. Specifically, by having a smaller inside diameter for the metal ring, the area for sealing is reduced, thereby reducing any risk of leaks appearing.

When assembling turbine, the metal ring is cooled in order to reduce its diameter prior to being inserted and put into position inside the annulus formed by the annular sectors of the nozzle stage. Once in alignment with the plane in which the nozzle stage extends, the metal ring is returned to ambient temperature so as to recover its original diameter and exert a radial force that is directed towards the casing on the nozzle stage so as to hold it in position.

In a second aspect of the turbine engine turbine, the outer shroud may include an annular rib having at least one crenellation and extending from a surface of the outer shroud that faces the casing, and the casing includes at least one tooth projecting from an inner circumferential surface of the casing towards the nozzle stage and arranged facing a crenellation of the annular rib of the nozzle stage in such a manner that said at least one tooth of the casing cooperates with said at least one crenellation in the annular rib of the nozzle stage in order to prevent the nozzle annulus formed by the nozzle stage from moving in rotation.

The crenellated annular rim thus provides means for preventing any movement in rotation of the nozzle stage.

In a third aspect of the turbine engine turbine, the casing may further include a shoulder projecting towards the nozzle stage, the shoulder of the casing and the annular rim of the outer shroud of the nozzle stage being dimensioned so that the shoulder of the casing forms an abutment against which the annular rim bears.

The shoulder of the casing can thus cooperate with the annular rim of the nozzle stage to provide an axial abutment in a first axial direction of the nozzle stage.

In a fourth aspect of the turbine engine turbine, the turbine may include a flow passage formed by the passage between the outer shroud and the inner shroud of the nozzle stage and within which there flows a gas stream in a flow direction, an inner surface of said inner shroud and said outer surface of the metal ring both presenting negative slopes in the flow direction of the gas stream.

Cooperation between the negative slope provided on the outer surface of the metal ring and the negative slope presented on the inner surface of the inner shroud of the nozzle stage so as to provide an axial abutment for the metal ring in a second axial direction of the nozzle stage. The second axial direction is opposite to the first axial direction of the nozzle. The first direction corresponds to the flow direction of the gas stream, and the second direction corresponds to the direction opposite to the flow direction of the gas stream.

In a configuration in which the shoulder of the casing is configured to form an axial abutment in the second axial direction of the nozzle stage, the inner surface of the inner shroud and the outer surface of the metal ring may present positive slopes in the flow direction of the gas stream, i.e. negative slopes in the direction opposite to the flow direction of the gas stream, thereby forming an axial abutment in the first axial direction of the nozzle stage.

In yet another configuration in which the turbine has other elements for forming axial abutments in both axial directions of the turbine, the inner surface of the inner shroud and the outer surface of the metal ring may present zero slope.

In a fifth aspect of the turbine engine turbine, the inner shroud of the nozzle stage may present an orifice or a notch, and the metal ring includes a lug projecting from the outer surface and suitable for co-operating with the notch or orifice in the inner shroud of the nozzle stage, the lug being formed by a pin or a peg or a screw forming a peg projecting from the outer surface.

The lug provided on the metal ring co-operating with the orifice provided in the inner shroud of the nozzle stage serves firstly to provide an axial abutment for the metal ring and secondly to provide means for preventing the metal ring from moving in rotation.

In a sixth aspect of the turbine engine turbine, the metal ring may present a section that is I-shaped.

The I-shape of the section of the metal ring serves to reduce the weight of the metal ring and thus the total weight of the turbine, while presenting a large outer contact area with the inner shroud of the nozzle stage and maintaining a high level of rigidity for the metal ring, with the possibility of making the metal ring as a single piece.

In a seventh aspect of the turbine engine turbine, the turbine may further comprise at least one gasket, such as a braided gasket or a wire O-ring, arranged between the inner shroud of the nozzle stage and the outer surface of the metal ring.

The gasket thus serves to improve sealing between the metal ring and the CMC nozzle stage, in particular in a hot environment in which any loss of curvature between the CMC nozzle and the metal ring and between the CMC nozzle stage and the casing runs the risk of opening leakage sections.

In an eighth aspect of the turbine engine turbine, the turbine may include at least one gasket, such as a braided gasket or a wire O-ring, arranged between the outer shroud of the nozzle stage and the inner surface of the casing.

In a ninth aspect of the turbine engine turbine, the metal ring may be made as a single piece.

Making the metal ring as a single piece serves to avoid any problem of alignment between the various metal ring sections and to optimize uniform radial deformation of the metal ring as a function of temperature. It also makes it possible to limit leakage by not creating leakage sections between different metal ring sectors.

The invention also provides a turbojet including at least one turbine engine turbine as defined above, wherein at least one of said at least one turbines is a high-pressure turbine or a low-pressure turbine.

The invention also provides an aircraft including at least one turbojet as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
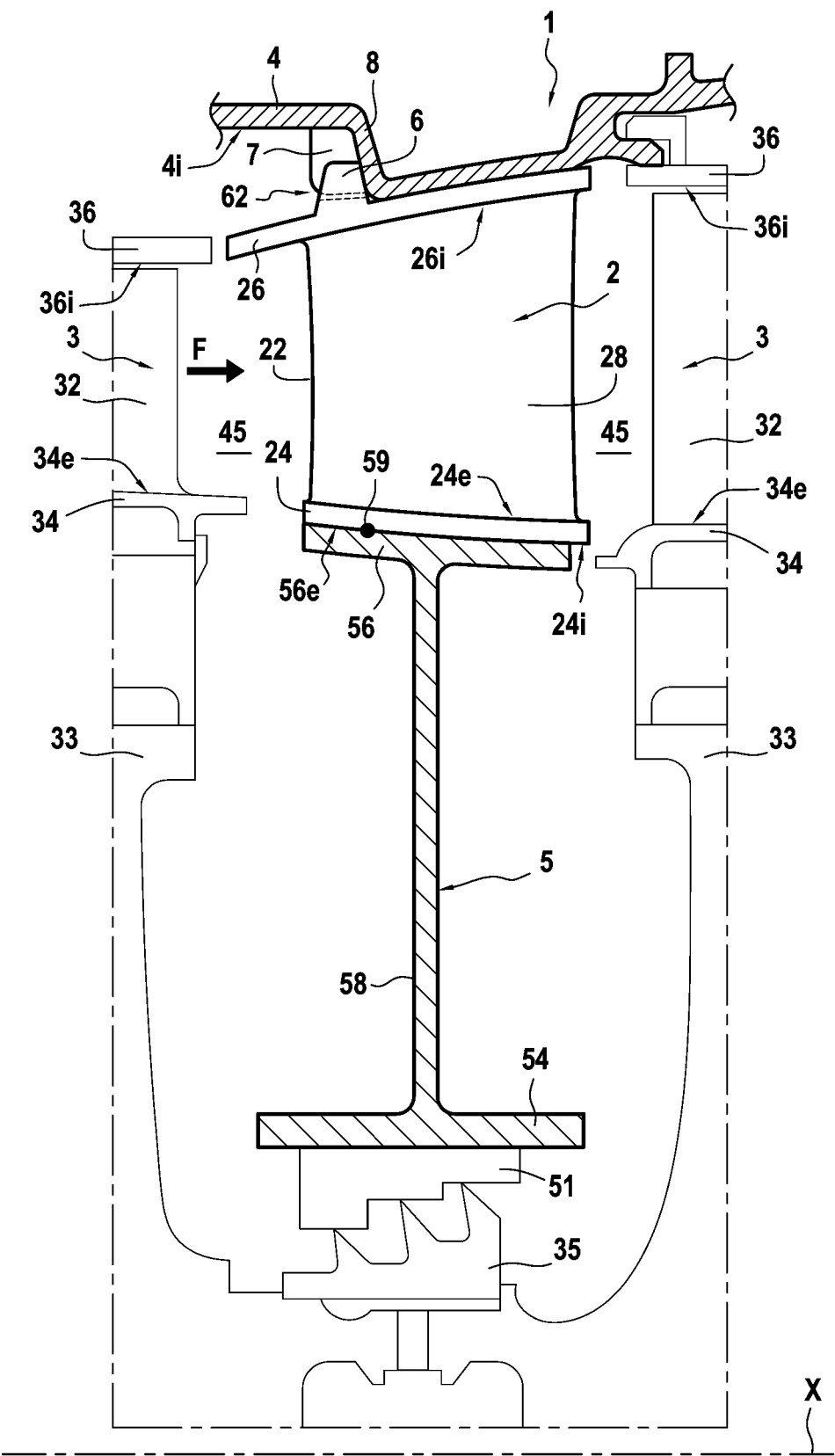
FIG. 1 is a diagrammatic section view of a portion of a turbine engine turbine in a first embodiment of the invention.

FIG. 1 is a diagrammatic section view of a turbine engine turbine in a first embodiment of the invention.

A high-pressure turbine 1 of a turbine engine, e.g. an aviation turbine engine, as shown in part in FIG. 1, comprises a plurality of stationary nozzle stages 2 that alternate with rotor wheels 3 in the flow direction, as indicated by an arrow in FIG. 1, of the gas stream F through the turbine 1, which nozzles and rotor wheels are mounted in a turbine casing 4.

Each rotor wheel 3 comprises a plurality of blades 32 having an inner shroud 34, and at least one airfoil 38 extending from the inner shroud 34 and connected thereto. On the inside of the inner shroud 34, the blade is extended by a root engaged in a slot in a disk 33. On the outside, the tips of the blades 32 face an abradable material carried by an annulus 36 in order to provide sealing at the tips of the blades 32.

Throughout the present specification, the terms "inner" and "outer" are used with reference to position or orientation relative to the axis of rotation X of the turbine 1.

The blades 32 may be conventional metal blades or they may be CMC material blades, e.g. obtained as described in Documents WO 2010/061140, WO 2010/116066, WO 2011/080443.

Figure 2:
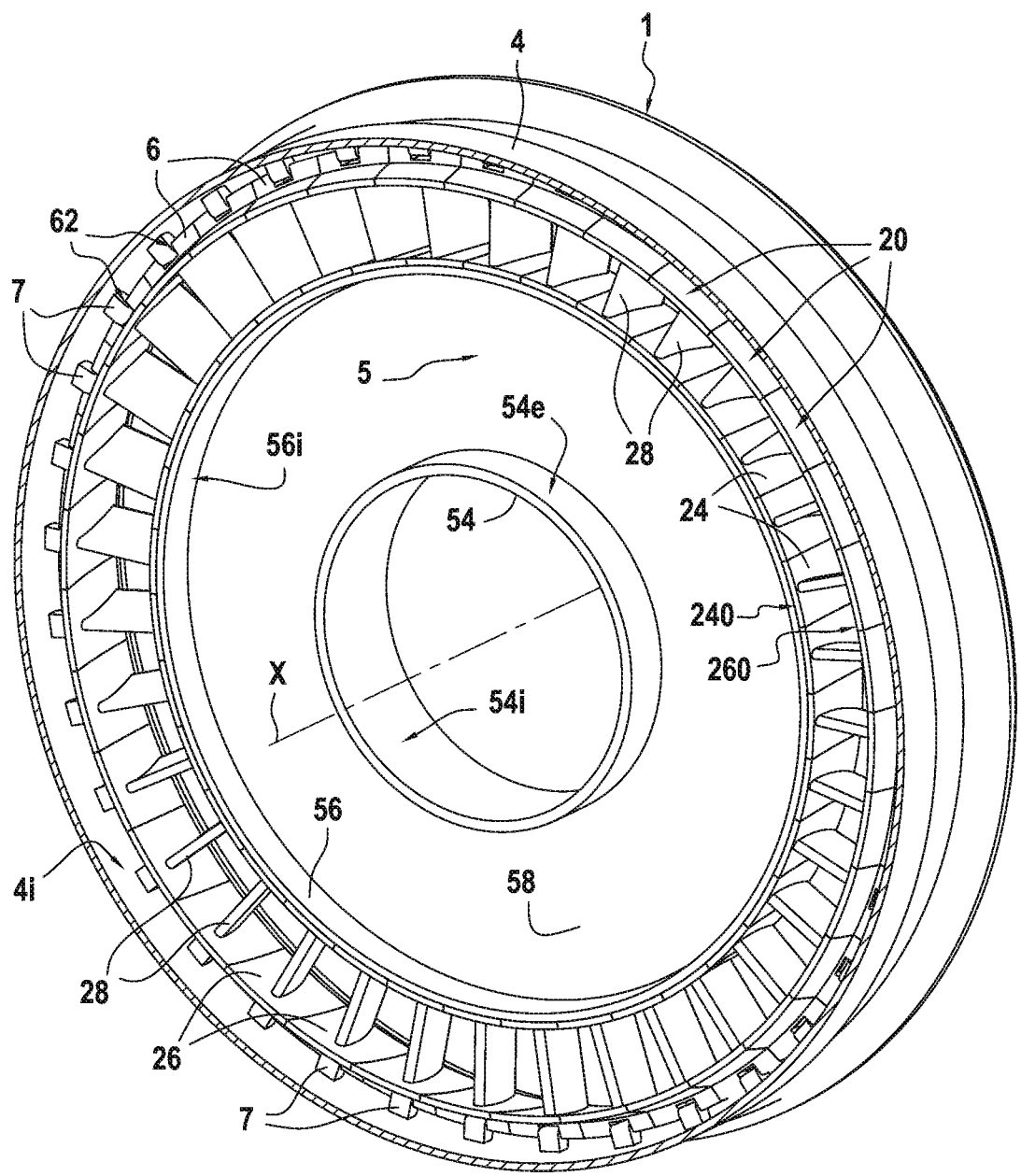
FIG. 2 is a diagrammatic perspective view of the turbine portion of FIG. 1.

At least one of the nozzle stages, such as the nozzle stage 2 in FIG. 1, is formed by uniting a plurality of annular sectors 20 made of CMC material, as shown in FIG. 2, which is a perspective view of the turbine portion of FIG. 1.

Each annular sector 20 of the nozzle stage 2 comprises an inner platform 24, an outer platform 26, and an airfoil 28 extending between the inner and outer platforms 24 and 26 and secured thereto. In a variant, a plurality of airfoils could extend between the inner and outer platforms of a single nozzle sector. Once they are assembled with the casing 4 of the turbine 1, the sectors 20 form a single nozzle annulus 2 presenting an inner shroud 240 made up by the juxtaposed inner platforms 24 of the sectors 20 and an outer shroud 260 made up of the juxtaposed outer platforms 26 of the sectors 20.

The inner shroud 240 of the nozzle stage 2 presents an outer surface 24e and an inner surface 24i, and the outer shroud 260 of the nozzle stage 2 also presents an outer surface 26e and an inner surface 26i. Since the sectors 20 form the nozzle stage 2, the inner platform 24 of each section 20 thus presents an outer surface portion 24e and an inner surface portion 24i, and the outer platform 26 of each sector 20 likewise presents an outer surface portion 26e and an inner surface portion 26i. The airfoil 28 of each sector 20 extends between the outer surface 24e of the inner shroud 240 and the inner surface 26i of the outer shroud 260, and more particularly between the corresponding outer surface portion 24e and the corresponding inner surface portion 24i.

The outer surfaces 24e and 34e of inner shrouds 240 and 34 of the nozzle stage 2 and of the rotor wheel 3, and the inner surfaces 26i and 36i of the outer shrouds 260 of the nozzle stage 2 and of the sealing annulus 36 for the rotor wheels 3 define a passage 45 for passing the gas stream F through the turbine 1.

Throughout the specification, terms "upstream" and "downstream" are used with reference to the flow direction of the gas stream F in the passage 45 as indicated by an arrow.

As can be seen in FIGS. 1 and 2, in this first embodiment, the turbine 1 has a metal ring 5 presenting a section of I-shape. The metal ring 5 thus has an inner shroud 54, an outer shroud 56, and a flat web 58 extending between the inner and outer shrouds 54 and 56 and secured thereto.

In other embodiments, the metal ring 5 may present other shapes.

The inner shroud 54 of the metal ring 5 presents an outer surface 54e and an inner surface 54i, and the outer shroud 56 also presents an outer surface 56e and an inner surface 56i. The flat web 58 extends between the outer surface 54e of the inner shroud 54 and the inner surface 56i of the outer shroud 56.

The outer surface 56e of the metal ring 5 bears against the inner surface 24i of the inner shroud 240 of the nozzle 2 via a wire O-ring 59 and exerts a radial force towards the casing 4 on the nozzle 2. The wire O-ring 59 is thus clamped between the outer surface 56e of the metal ring 5 and the inner surface 24i of the inner shroud 240 of the nozzle stage 2, and provides sealing between these two elements.

The metal ring 5 also supports on the inner surface 54i of the inner shroud 54 an abradable material 51 facing wipers 35 carried by the disk 33 in order to provide the passage 45 with sealing on the inside.

The metal ring 5 may be made up of juxtaposed sectors each constituting an abradable cartridge, or it may be made as a single piece, as shown in FIG. 2.

The diameter of the surface of the outer shroud 56 of the metal ring 5 that is in contact with the inner shroud 240 of the nozzle stage 2, i.e. the diameter of the outer surface 56e of the outer shroud 56 of the metal ring 5, is greater than the diameter of the surface of the inner shroud 240 of the nozzle stage 2 for each axial position from upstream to downstream of the metal ring 5 and of the nozzle stage 2, i.e. greater than the diameter of the inner surface 24i of the inner shroud 240 of the nozzle stage 2.

The nozzle stage 2 is thus held in compression against the casing 4 and the metal ring 5.

The turbine 1 is assembled by initially positioning the sectors 20 of the nozzle stage 2 against an inner surface 4i of the casing 4 over its entire inside periphery, and then inserting the metal ring 5 that has been cooled to a temperature that enables its diameter to be reduced to a dimension that is smaller than the diameter of the inner surface 24i of the inner shroud 240 of the nozzle stage 2 for a given axial position. The metal ring 5 is then returned to ambient temperature while being held in position until it returns to its initial diameter and applies a radial force serving to hold the nozzle stage 2 pressed against the casing 4.

During insertion of the metal ring 5 in the turbine 1, the sectors 20 of the nozzle stage 2 are held stationary in position by means of a specific tool. The specific tool may for example be in the form of a ring possessing teeth projecting in a direction parallel to the axis of rotation X of the turbine 1 so that the teeth can be inserted into the spaces between the airfoils 28 of the nozzle stage 2 and apply a radial force against the outer platform 26 of the sectors 20 making up the outer shroud 260 of the nozzle stage 2 in order to hold them pressed against the casing 4.

Figure 3:
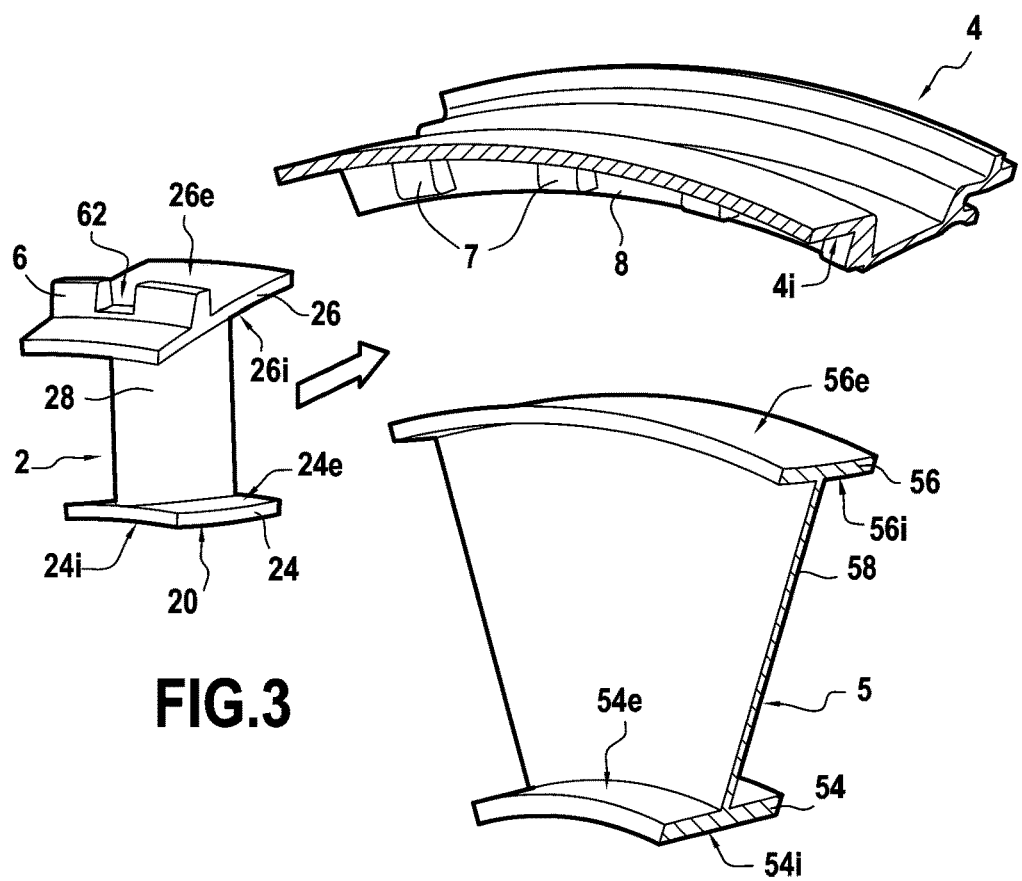
FIG. 3 is a fragmentary perspective view of the turbine nozzle of FIG. 1.

FIG. 3 is a fragmentary exploded view in perspective of the metal ring 5 for a sector 20 of the nozzle stage 2, together with the casing 4.

As can be seen in FIGS. 1 to 3, the outer shroud 260 of the nozzle stage 2 has an annular rib 6 presenting at least one crenellation 62 per sector 20. The annular rib 6 extends on the outer surface 26e of the outer shroud 260 of the nozzle stage 2.

Facing each crenellation 62 in the annular rib 6, the casing 4 has a tooth 7 on its inner surface 4i, which tooth projects towards the axis of rotation X of the turbine 1, i.e. towards the nozzle stage 2. The teeth 7 are distributed over the entire circumference of the inner surface 4i of the casing 4 so as to have one tooth 7 facing each crenellation 62 in the annular rib 6 of the nozzle stage 2.

In a variant, the casing could have only one tooth or indeed only a few teeth, or else pegs, suitable for co-operating with one or more crenellations 62 in the annular rib 6.

The teeth 7 and the crenellations 62 are shaped to co-operate in such a manner as to prevent any movement in rotation of the nozzle stage 2 relative to the casing 4, which is itself stationary.

As also shown in FIGS. 1 to 3, the casing 4 has a shoulder 8 projecting towards the nozzle stage 2. The shoulder 8 and the annular rib 6 of the outer shroud 260 of the nozzle stage 2 are dimensioned and shaped so as to co-operate in such a manner that the shoulder 8 forms a first axial abutment against which the rib 6 bears, thereby preventing any axial movement in the gas stream flow direction F indicated by the arrow in FIG. 1.

In the presently-illustrated example, the outer surface 56e of the outer shroud 56 of the metal ring 5 also presents a negative slope in the flow direction F of the gas stream, as indicated by the arrow in FIG. 1, within the flow passage 45. This slope makes it possible to provide a second axial abutment for the metal ring 5, preventing any axial movement in a direction opposite to the flow direction F of the gas stream as indicated by the arrow in FIG. 1.

The effectiveness of the second axial abutment is improved by the negative slope presented by the inner surface 4i of the casing 4 extending from the shoulder 8 to a downstream portion of the shoulder 8.

Figure 4:
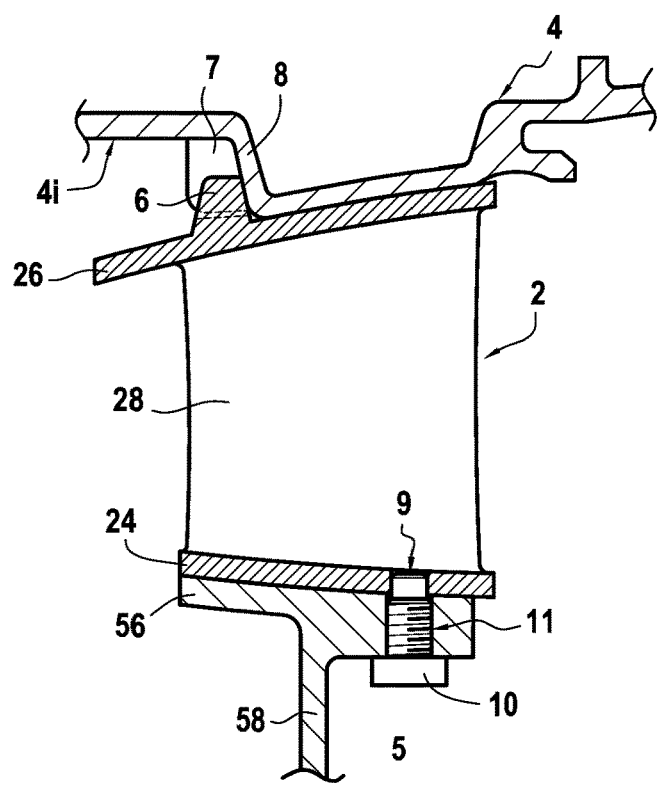
FIG. 4 is a diagrammatic section view of a portion of a turbine engine turbine in a second embodiment of the invention.

In a second embodiment as shown in FIG. 4, the inner shroud 240 of the nozzle stage 2 presents an orifice 9, and the metal ring 5 has a tapped hole 11 and a screw 10 that is threaded over a portion only of its shank, the tapped hole 11 in the metal ring 5 being in alignment with the orifice 9 in the inner shroud 240 of the nozzle stage 2.

The screw 10 is screwed into the tapped hole 11 until the non-threaded end of the screw 10 is inserted in the orifice 9 in the inner shroud 240 of the nozzle stage 2. An interference fit peg could equally well suffice. Under such circumstances, the hole 11 would not be tapped.

The screw 10 forming a peg at its free end that is inserted in the nozzle stage 2 serves to provide both an axial abutment and means for preventing the metal ring 5 from moving in rotation.

In the second embodiment, the presence of the orifice 9 and of the screw 10 makes it possible, optionally, to avoid having negative and positive slopes in the nozzle stage 2, given that the functions performed by those elements are performed by the assembly formed by the screw 10 and the orifice 9.

The invention thus provides a turbine engine turbine having a turbine nozzle stage made of CMC that can be mounted in simplified manner and that is adapted to form a rigid assembly with improved sealing.

The invention claimed is:

1. A turbine engine turbine comprising:
    a casing;
    a turbine nozzle stage; and
    a metal ring for supporting abrasive material,
    the turbine nozzle stage being made of ceramic matrix composite material and comprising a plurality of annular sectors forming an annulus presenting an inner shroud and an outer shroud, each annular sector having an inner platform forming a portion of the inner shroud, an outer platform forming a portion of the outer shroud, and an airfoil extending between the outer platform and the inner platform and secured thereto,
    the metal ring comprising a sector that is at least partially annular,
    wherein the metal ring presents an outer surface in contact with an inner surface of the inner shroud of the turbine nozzle stage opposite from an outer surface of the inner shroud from which each airfoil of the plurality of annular sector extends, and
    wherein, in a pre-assembly state at an ambient temperature, an outside diameter of the outer surface of the metal ring is greater than a diameter of the inner surface of the inner shroud of the turbine nozzle stage at each axial position from upstream to downstream of the metal ring and of the turbine nozzle stage such that the turbine nozzle stage is held in compression between the casing and the metal ring in an assembled state.

2. The turbine according to claim 1, wherein the outer shroud includes an annular rib having at least one crenellation and extending from a surface of the outer shroud that faces the casing, and the casing includes at least one tooth projecting from an inner circumferential surface of the casing towards the turbine nozzle stage and arranged facing said at least one crenellation of the annular rib of the turbine nozzle stage in such a manner that said at least one tooth of the casing cooperates with said at least one crenellation in the annular rib of the turbine nozzle stage in order to prevent the turbine nozzle stage from moving in rotation.

3. The turbine according to claim 2, wherein the casing further includes a shoulder projecting towards the turbine nozzle stage, the shoulder of the casing and the annular rib of the outer shroud of the turbine nozzle stage being dimensioned so that the shoulder of the casing forms an abutment against which the annular rib bears.

4. The turbine according to claim 1, including a flow passage formed by a passage between the outer shroud and the inner shroud of the turbine nozzle stage and within which there flows a gas stream in a flow direction, an inner surface of said inner shroud and said outer surface of the metal ring both presenting negative slopes in the flow direction of the gas stream.

5. The turbine according to claim 1, wherein the inner shroud of the turbine nozzle stage presents an orifice or a notch, and the metal ring includes a lug projecting from the outer surface of the metal ring and suitable for co-operating with the notch or orifice in the inner shroud so as to prevent the metal ring from moving axially or in rotation, the lug being formed by a pin or a peg or a screw forming a peg projecting from the outer surface of the metal ring.

6. The turbine according to claim 1, wherein the metal ring presents an I-shaped section.

7. The turbine according to claim 1, further including at least one gasket arranged between the inner shroud of the turbine nozzle stage and the outer surface of the metal ring.

8. The turbine according to claim 1, further including at least one gasket arranged between the outer shroud of the turbine nozzle stage and an inner surface of the casing.

9. The turbine according to claim 1, wherein the metal ring is made as a single piece.

10. A turbojet including the turbine engine turbine according to claim 1, wherein the turbine engine turbine is a high-pressure turbine or a low-pressure turbine.

11. An aircraft including at least one turbojet according to claim 10.

* * * * *